(12) United States Patent
Häberle et al.

(10) Patent No.: US 7,937,603 B2
(45) Date of Patent: May 3, 2011

(54) INTELLIGENT POWER MONITORING UNIT

(75) Inventors: Norbert Häberle, Lommiswil (CH); Peter Kull, Rüttenen (CH)

(73) Assignee: Schaffner EMV AG, Luterbach (CH)

( * ) Notice: Subject to any disclaimer, the term of this patent is extended or adjusted under 35 U.S.C. 154(b) by 539 days.

(21) Appl. No.: 12/036,142

(22) Filed: Feb. 22, 2008

(65) Prior Publication Data

US 2008/0148084 A1 Jun. 19, 2008

Related U.S. Application Data

(63) Continuation of application No. PCT/EP2005/054337, filed on Sep. 2, 2005.

(51) Int. Cl.
*G06F 1/00* (2006.01)
(52) U.S. Cl. .................................. 713/340; 713/300
(58) Field of Classification Search .............. 713/340, 713/300; 318/400.24
See application file for complete search history.

(56) References Cited

U.S. PATENT DOCUMENTS

| 5,278,771 | A |  | 1/1994 | Nyenya et al. |
| 5,446,647 | A | * | 8/1995 | Ikeda et al. ................... 363/89 |
| 6,404,348 | B1 | * | 6/2002 | Wilfong .................... 340/657 |
| 7,561,388 | B2 | * | 7/2009 | Sung et al. ................... 361/42 |
| 2007/0138971 | A1 | * | 6/2007 | Chen ..................... 315/209 R |
| 2008/0192513 | A1 | * | 8/2008 | Kusubayashi ............ 363/21.01 |

FOREIGN PATENT DOCUMENTS

WO  WO 0048149  8/2000

* cited by examiner

*Primary Examiner* — Nitin C Patel
(74) *Attorney, Agent, or Firm* — Blank Rome LLP

(57) ABSTRACT

It is disclosed an intelligent power monitoring unit (2) for the monitoring of a power supply (1), which comprises a power input (24) for the input of electrical power, a power output (25) for the output of electrical power, a power line connecting the power input (24) to the power output (25), a first EMI/RFI filter (21) for the reduction of electromagnetic noise on the power line, monitoring means for monitoring parameters of the electrical power on the power line and/or for monitoring parameters of the first EMI/RFI filter (21), a data processing unit (29) for receiving and processing signals from the monitoring means and for issuing control signals basing on these signals, and a data communication bus for exchanging data between the data processing unit (29) and a device (51) external to the monitoring unit (2). The invention relates as well to a power supply (1) with such an intelligent power monitoring unit (2).

15 Claims, 2 Drawing Sheets

INTELLIGENT POWER MONITORING UNIT

RELATED APPLICATIONS

The present application is a continuation of international application PCT/EP2005/054337, filed on Sep. 2, 2005, the content of which is hereby incorporated by reference.

FIELD OF THE INVENTION

The present invention relates to an intelligent power monitoring unit for monitoring an electrical power supply. The present invention also relates to a power supply comprising a corresponding intelligent power monitoring unit.

DESCRIPTION OF RELATED ART

The provision of correct power supply for electrical systems implies several challenges.

A challenge is in particular to design power supply systems complying to electromagnetic compatibility and/or power quality regulations which can vary from country to country. Regulations for example set limits under which the power supply's electromagnetic radiations and/or disturbances possibly propagating from the power supply to the distribution network have to be kept.

Another challenge is to design a power supply system providing to the load and to the power supply system itself, a certain level of protection against damages due to external and/or internal events. External events may comprise lightning events, wrong supply voltage and/or phase drop-outs. Internal events may comprise short-circuits, machine overload, etc., created by the power supply system itself, for example in case of a load damage, which can then lead for example to over-current and/or over-temperature situations. Such situations must preferably lead to controlled power supply interruption.

Various components can be found to realize the required protection and/or filtering functionalities in order to achieve these challenges. Most prior art solutions, however, are expensive in design, material and fabrication aspects.

FIG. 1 shows a typical functional diagram of a prior art power supply 1. The power supply 1 is provided with a line input 11 through which it is connected to a power source, for example to a power distribution network. In this example, the supplied input voltage is a mono- or multiphase AC voltage. The cabinet 1 is usually provided with a load output 12 for the connection of a load, for example of an electrical motor or any other electrical appliance, which will be supplied and possibly driven by the power supply's load output voltage. The power supply's load output voltage is for example a mono- or multiphase AC voltage, possibly with a frequency and/or an amplitude different to that of the supplied input voltage. The power supply 1 is further provided with one or more optional sense inputs 13 for receiving signals from various sensors monitoring some functional parameters of the load and/or of the power source. The sense signals applied to the sense input are for example used for signaling abnormal load conditions to the power supply 1. The power supply 1 is further preferably provided with an optional control connection 14 for receiving and/or outputting control signals from and/or to external devices, for example from and/or to the load. Control signals from the control power supply 1 can be used for example for regulating the functioning of the load and/or to activate some appropriate external security devices in case of abnormal conditions. Control signals received by the power supply may for example be used for switching the power supply off in case of emergency cases.

After line input 11, the power supply 1 preferably comprises protecting devices for protecting the power supply 1 against events which might occur in the power source. These protecting devices include for example a surge protector 30 for protection against over-voltage events and circuit breakers 32 for protection against over-current events. Preferably, the protecting devices further include safety interrupters 31 for allowing a manual power-on/off of the power supply 1. On the power line to the load output 12 and behind the protecting devices 30, 31, 32, the control cabinet 1 comprises contactors 40 for allowing a controlled load power on/off, a power EMI/RFI (Electro-Magnetic Interference/Radio Frequency Interference) filter 41 for the suppression of the noise possibly generated by the load, and a motor drive 50 regulating for example the load's speed. The output of the motor drive 50 is then typically directly connected to the load output 12. The control cabinet 1 further comprises an AC to DC converter 43 whose input is connected to the power line inside the power supply 1, beyond the security devices 30, 31, 32. Preferably, the input of converter 43 is connected to the input voltage over an AC/DC input EMI/RFI filter 42 for the suppression of noise generated by the AC to DC converter 43 on its AC input. The AC to DC converter 43 provides preferably low voltage DC power to a control unit 51 which controls the power supply 1 and/or runs it according to predefined programs. The control unit 51 typically receives the sense signals from sense input 13 and send and/or receives control signals over control connection 14. The control unit 51 then regulates the power supply 1 taking into account the received sense and/or control signals.

In a variant prior art embodiment, at least part of the protecting elements 30, 31, 32, for example the surge protector 30 and/or the circuit breakers 32, are further provided with auxiliary switches which are connected to the control unit 51, thus enabling automatic alarming, service or other reactions in case these protecting elements 30, 32 are being activated by events on the power source's side. These signaling connections are illustrated in FIG. 2 by the arrows 300 and 320.

An often delicate aspect of the system design is the sufficient reduction of the noise generated by the different system units. Not only filter components but also placement and wiring situations influence the overall EMI/RFI suppression result. It is thus often necessary to use the services of EMC specialists for analysis and optimization of inadequate system designs.

An aim of the invention is thus to provide a device allowing for a significant ease in the design of power supply systems.

Another aim of the present invention is to provide a power monitoring unit allowing for an integrated supervision of the functioning of a power supply.

BRIEF SUMMARY OF THE INVENTION

According to the invention, these aims are achieved by means of an intelligent power monitoring unit for the monitoring of a power supply, comprising:

a power input for the input of electrical power, a power output for the output of electrical power, a power line connecting the power input to the power output, a first EMI/RFI filter for the reduction of electromagnetic noise on the power line, monitoring means for monitoring parameters of the electrical power on the power line and/or for monitoring parameters of the first EMI/RFI filter, a data processing unit for receiving and processing signals from the monitoring means and for issuing control signals basing on these signals, a data communication bus for exchanging data between the data processing unit and a device external to the monitoring unit.

According to the invention, these aims are also achieved by means of a power supply with such an intelligent power monitoring unit.

The power supply front-end module of the invention, also called Intelligent Power Monitoring Unit (IPMU), preferably incorporates EMI and RFI reduction means, low voltage DC supply and sophisticated monitoring and diagnosis means allowing an accurate and precise control of the power supply's operation. It further offers correct integrated EMC solution as well as comfortable communication means, thus allowing for a massive reduction of the design complexity and costs compared to prior art solutions, as the interfaces to the module and its components are greatly simplified.

According to a preferred embodiment of the invention, a further advantage of the power supply front-end module of the invention is its modularity, as further functions such as for example surge protectors, circuit breakers, contactors and/or other functions, can easily be incorporated within the module and connected to an industry standard communication interface in order for example to directly control circuit breakers or signaling devices.

In order to achieve above-mentioned functionalities, the intelligent power monitoring unit (IPMU) of the invention preferably comprises:

data processing means for monitoring the components of the IPMU and, more generally, the power supply's operation, and/or for allowing communication, preferably via a standard bus interface, with external devices, for example with an external control unit;

software elements stored on a data storage device for defining the IPMU's functionality and/or operation when said software elements are run on said data processing means;

memory for storing for example parameters and/or variables;

an AC to DC converter for provision of preferably low voltage DC power for internal as well as external use;

EMI/RFI filters for filtering noise on the power line to the load as well as for the AC to DC converter.

Thanks to its flexible construction, the power monitoring unit of the invention allows the construction of different application specific topologies with the possibility to further incorporate, besides contactors, circuit breakers and/or surge protectors, and/or to provide connection means for auxiliary switches of external such devices and for contactor control inputs, in order to link them to the IPMU's data processing unit.

BRIEF DESCRIPTION OF THE DRAWINGS

The invention will be better understood with the aid of the description of preferred embodiments given by way of example and illustrated by the figures, in which.

Already discussed

Already discussed

DETAILED DESCRIPTION OF POSSIBLE EMBODIMENTS OF THE INVENTION

Figure 1:
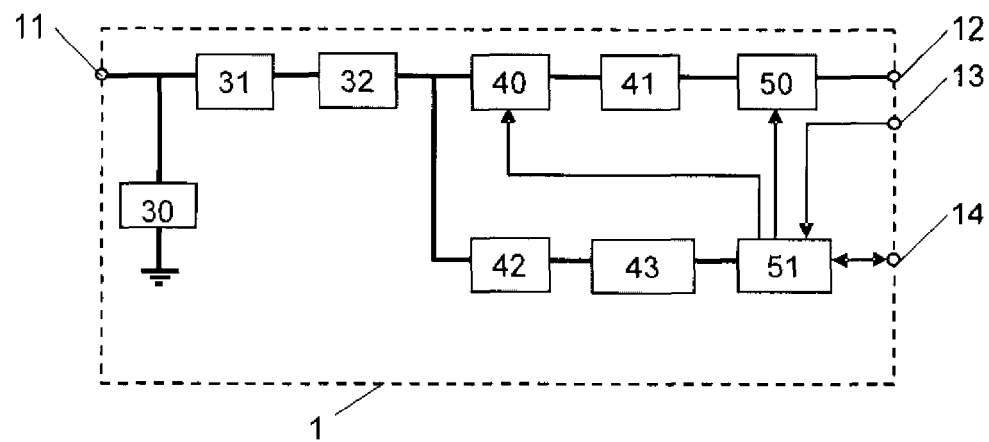
FIG. 1 shows the functional diagram of a prior art power supply.
Figure 2:
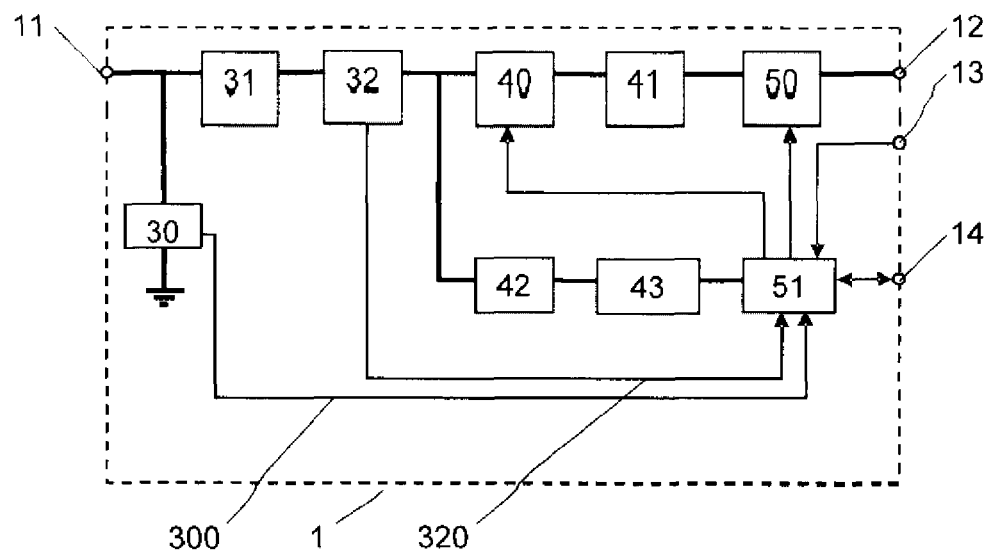
FIG. 2 shows the functional diagram of another prior art power supply, with protection elements offering auxiliary switches, which can be connected to a control unit, thus enabling automatic alarming, service or other reactions
Figure 3:
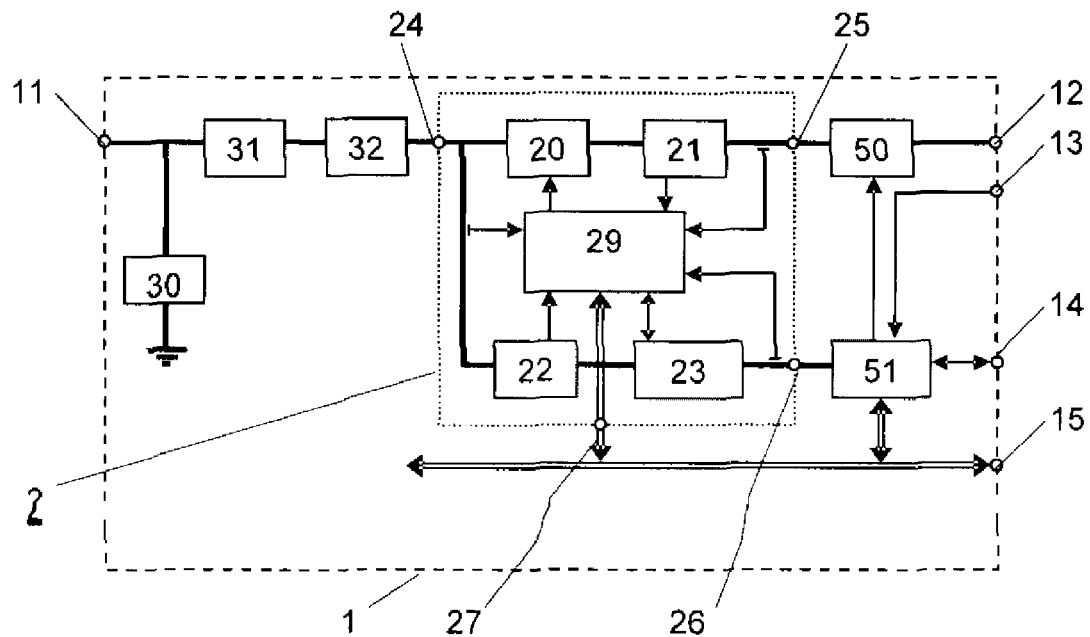
FIG. 3 shows the functional diagram of a power supply comprising an intelligent power monitoring unit according to an embodiment of the invention.

FIG. 3 shows the functional diagram of a power supply 1 according to an embodiment of the invention.

The power supply 1 is preferably provided with a line input 11 allowing it to be directly or indirectly connected to a power source, for example to a power distribution network, and a load output 12 for directly or indirectly connecting a load, for example an electrical motor or any other electrical appliance, which will be supplied with and possibly driven by the load voltage provided at the load output 12. In this example, the input voltage applied to the line input 11 and the load voltage available at the load output 12 are both mono- or multiphase AC voltage. Input voltage and load voltage can however have different frequencies and/or amplitudes. In particular, the frequency and/or amplitude of the load voltage can preferably be varied in order to drive the load, while the input voltage is preferably constant.

The power supply 1 further comprises an optional sense input 13 for receiving, for example, signals from external sensors. In a preferred embodiment, the external sensors measure various parameters of the load and/or of the environment, such as the room temperature, the load's motor rotation speed and/or any other relevant parameter. The sense signal applied to the sense input 13 is then preferably a signal representative of the value of the measured parameters and/or an alarming signal in case abnormal conditions are being detected by the sensors, for example in case one or more of the measured parameters go over a predefined threshold. In FIG. 3, out of simplification purposes, the sense input 13 is represented as a single input. The one skilled in the art will however understand that it might comprise more than one electrical connection in order to receive more than one signal in parallel, for example. These connections can be grouped into one or more connection elements, such as preferably standard electrical connectors.

The power supply 1 further preferably comprises a control connection 14 for receiving and/or sending control signals to and/or from the control cabinet 1. Inside the control cabinet 1, the control connection 14 is for example connected to a programmable logic circuit (PLC) 51 which controls the characteristics of the load voltage, for example its amplitude and/or its frequency. The control signals are used for example in order to modify the load voltage for adapting it to the actual needs of the load. Out of simplification purposes, the control connection 14 is also represented as a single input. The one skilled in the art will understand that this connection might comprise more than one electrical connection in order to receive and/or send for example more than one control signal in parallel. The required connections can be grouped into one or more connection elements, such as preferably standard electrical connectors, for example.

According to the invention, the power supply 1 preferably further comprises a bus connection 15 whose purpose will be explained in more details below.

On its input side, the power supply 1 preferably comprises protecting devices in order to protect the power supply system and/or the load against abnormal electrical situations possibly occurring on the power source's side, for instance on the distribution network. The protecting devices include for example a surge protector 30 for protection against overvoltage events, and circuit breakers 32 for protection against over-current events. Preferably, the protecting devices further include safety interrupters 31 for allowing a manual power-on/off of the power supply 1.

On its output side, the power supply 1 comprises for example a motor drive 50 for transforming the input voltage into the load voltage required for supplying and possibly driving the load. The motor drive 50 is preferably controlled by the PLC 51 which sends signals to the motor drive 50 for regulating the load voltage depending on the sense and/or control signals applied to the corresponding inputs 13, 14 by external devices, and/or depending on internally programmed operation schemes.

According to the invention, the power supply 1 comprises an intelligent power monitoring unit (IPMU) 2 for monitoring the operation of the power supply 1 and optionally for providing low voltage DC power to the PLC 51. In a preferred embodiment, the monitoring unit 2 is connected between the protecting devices 30, 31, 32 and the motor drive 50. It is thus protected from external events possibly occurring on the power source's side. The monitoring unit 2 comprises a data processing unit 29 for monitoring various operation parameters and issue adequate control signals in case an abnormal and/or dangerous situation is being detected.

The monitoring unit 2 preferably includes contactors 20 for allowing a controlled load power on/off, a first EMI/RFI (Electro-Magnetic Interference/Radio Frequency Interference) filter 21 for the suppression of the noise generated by the load, and an AC to DC converter 23 for transforming a part of the input voltage into low voltage DC power which will be provided to the data processing unit 29 inside the monitoring unit 2, and to the PLC 51 which is outside the monitoring unit 2. The monitoring unit 2 preferably further includes a second EMI/RFI filter 22 for the suppression of noise generated by the AC to DC converter 23.

According to the invention, the data processing unit 29 monitors the operation parameters of the monitoring unit by sensing for example the voltage at its AC input 24 and at its AC and DC outputs 25 and 26, respectively. The monitoring unit possibly further monitors the parameters of the first and second EMI/RFI filters 21, 22, for example the saturation level of their inductive component's magnetic core, the noise level at the filters inputs and/or outputs, etc. This monitoring is done for example in that the monitored parameters are measured with the help of appropriate sensors or any other measuring device (not represented), the output signal of these sensors being than fed to the data processing unit 29 which will process them in order to determine whether the power supply operates in normal conditions.

If abnormal situations, for example too high noise levels, core saturation, etc., are detected, the data processing unit 29 preferably issues appropriate control signals in order to modify for example the operation parameters of the AC to DC converter 23, for switching off the load by acting on the contactors 20, and/or for influencing the operation of external devices.

Preferably, signals to devices outside the monitoring unit 2 are sent over a communication bus which preferably complies to usual industry standards, although proprietary communication algorithms can also be used within the frame of the invention. The data processing unit 29 thus preferably communicates with the PLC 51 over this communication bus. Control and/or information signals can thus be exchanged between the data processing unit 29 which directly monitors the operation parameters of the components inside the monitoring unit 2, and the PLC 51 which receives sense signals from outside the power supply and directly monitors the motor drive 50. All monitoring signals can thus be centralized and processed within the monitoring unit 2 which can then issue the most appropriate control signals for adapting the power supply's operation parameters and/or completely switch it off in case of emergency. The communication bus is preferably mastered by the data processing unit 29.

The monitoring unit 2 is preferably built as a single component wherein all its constituting elements are preferably included inside housing which is at least partly closed on all sides. Preferably standard connectors or other connecting elements are provided on the housing's walls in order to allow its interface to the other components of the power supply 1. Appropriate power connectors are used in particular for the AC input 24, for the AC output 25 and for the low voltage DC output 26, while a data bus connector is preferably used for the communication bus interface 27.

The monitoring unit 2 can thus easily be integrated in a modular way within a power supply having appropriate interfaces, which greatly facilitates the power supply's design. The monitoring unit 2 preferably provides all monitoring functionalities required for the correct operation and the efficient protection of the power supply 1. A designer can thus integrate the monitoring unit 2 of the invention as a single module which doesn't require any further design.

In a preferred embodiment, the communication bus is accessible from outside the power supply 1 through a second bus interface 15, in order for example to allow the communication of external devices such as for example the load, a control station, etc. with the monitoring unit 2 of the power supply 1, in order for example to regulate the operation of the power supply and/or in order for them to be controlled by the power supply. Preferably, the communication bus complies to industry standards and the bus interface 15 is a standard interface, such that any external devices comprising a compatible bus interface can be connected to it and thus communicate with the monitoring unit 2.

Figure 4:
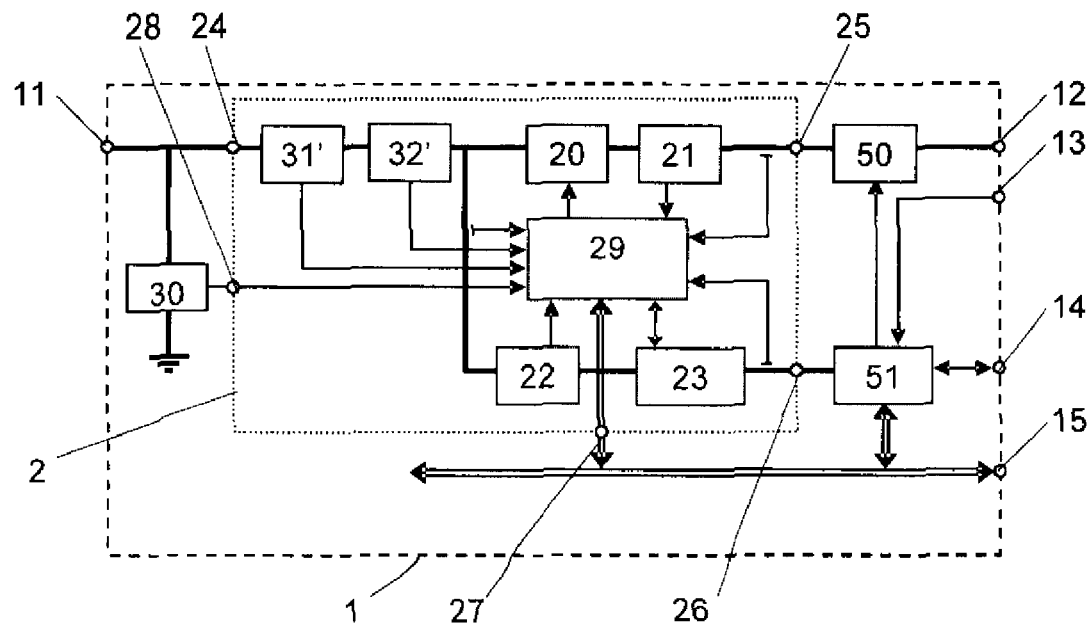
FIG. 4: shows the functional diagram of a power supply comprising an intelligent power monitoring unit according to another embodiment of the invention.

In a variant embodiment illustrated in FIG. 4, the monitoring unit 2 further monitors the protecting devices 30, 31', 32'. According to this embodiment, a part of the protecting devices, for example interrupters 31' and circuit breakers 32' are integrated within the monitoring unit 2, while other protecting devices, for example a surge protector 30 remains external to the monitoring unit. Preferably, the external protecting element 30 is also monitored by the monitoring unit and can for example issue signals to the data processing unit 29 through an appropriate interface 28.

Further monitoring, protecting devices and/or functionalities can be integrated within the monitoring unit 2 of the invention, depending for example on specific needs of particular applications.

According to the embodiment of FIG. 4, the monitoring unit 2 thus monitors the protecting devices 30, 31', 32' which comprises auxiliary switches issuing a signal to the data processing unit 29 when the corresponding protecting device 30, 31', 32' is activated because for example, of external hazardous events occurring on the power source's side. The data processing unit 29 receiving such a signal can then for example switch off the load by acting on contactors 20.

In the embodiments described above, both input voltage and load voltage are mono- or multiphase voltages, for example tri-phase voltages. The monitoring unit 2 of the invention is however also applicable to power supplies working with a DC input voltage and/or a DC output voltage. The AC to DC converter 23 is then possibly replaced by a DC to DC transformer, if needed.

The invention claimed is:

1. Intelligent power monitoring unit for the monitoring of a power supply, comprising:
   a power input for the input of electrical power,
   a power output for the output of electrical power,
   a power line connecting said power input to said power output,
   a first Electro-Magnetic Interference/Radio Frequency Interference (EMI/RFI) filter for the reduction of electromagnetic noise on said power line,
   monitoring means for monitoring parameters of the electrical power on said power line or for monitoring parameters of said first EMI/RFI filter,
   a data processing unit for receiving and processing signals from said monitoring means and for issuing control signals based on said signals from said monitoring means,
   a data communication bus for exchanging data between said data processing unit and at least one device external to said monitoring unit.

2. The monitoring unit of claim 1, said electrical power being AC voltage, said monitoring unit further comprising an AC to DC converter for providing low voltage DC power to said data processing unit.

3. The monitoring unit of claim 2, further comprising a second EMI/RFI filter for the reduction of electromagnetic noise generated by said AC to DC converter.

4. The monitoring unit of claim 3, said monitoring means further monitoring parameters of said second EMI/RFI filter.

5. The monitoring unit of claim 2, said electrical power being a tri-phase AC voltage.

6. The monitoring unit of claim 2, further comprising a DC output for providing low voltage DC power to at least one device external to said monitoring unit.

7. The monitoring unit of claim 2, said monitoring means further monitoring parameters of said low voltage DC power.

8. The monitoring unit of claim 1, said electrical power being DC voltage, said monitoring unit further comprising voltage transformer for providing low voltage DC power to said data processing unit.

9. The monitoring unit of claim 1, further comprising contactors for disconnecting said power input from said power output, said contactors being controlled by said data processing unit.

10. The monitoring unit of claim 1, further comprising at least one interface for receiving signals from at least one protecting devices of a power supply.

11. The monitoring unit of claim 10, said at least one protecting devices of a power supply being a surge protector for protection against over-voltage events on said electrical power.

12. The monitoring unit of claim 1, further comprising at least one protecting device connected to said data processing unit in order to allow the monitoring of said at least one protecting device by said data processing unit.

13. The monitoring unit of claim 1, being built as a single component for its modular integration in a power supply.

14. The monitoring unit of claim 13, being enclosed in a housing, said housing being at least partly closed on all sides.

15. Power supply comprising an intelligent power monitoring unit according to claim 1, and a bus interface for allowing a data exchange between said data processing unit and at least one device of said power supply external to said monitoring unit.

* * * * *